United States Patent
Funaki et al.

(10) Patent No.: US 7,646,520 B2
(45) Date of Patent: Jan. 12, 2010

(54) OPTICAL ELEMENT HOLDER, LIGHT SCANNING UNIT, AND IMAGE FORMING APPARATUS WITH ACCOMMODATION FOR HEAT-RELATED DIMENSIONAL CHANGES OF OPTICAL ELEMENT

(75) Inventors: Keiichi Funaki, Osaka (JP); Akihiro Masaki, Osaka (JP)

(73) Assignee: Kyocera Mita Corporation (JP)

( * ) Notice: Subject to any disclaimer, the term of this patent is extended or adjusted under 35 U.S.C. 154(b) by 101 days.

(21) Appl. No.: 11/700,496

(22) Filed: Jan. 31, 2007

(65) Prior Publication Data

US 2007/0195395 A1    Aug. 23, 2007

(30) Foreign Application Priority Data

Feb. 17, 2006    (JP) .............................. 2006-040699

(51) Int. Cl.
*G02B 26/08* (2006.01)
(52) U.S. Cl. ................. 359/205.1; 359/221.2
(58) Field of Classification Search ................. 359/196, 359/819–820, 205.1, 221.5, 196.1–226; 347/242–245, 347/259–261
See application file for complete search history.

(56) References Cited

U.S. PATENT DOCUMENTS

| 6,657,760 B2* | 12/2003 | Fukita et al. ................. 359/205 |
| 2001/0033434 A1* | 10/2001 | Fukuzawa ................... 359/811 |
| 2005/0219672 A1 | 10/2005 | Fujita et al. |

FOREIGN PATENT DOCUMENTS

| JP | 6-43617 | 6/1994 |
| JP | 8-146318 | 6/1996 |
| JP | 2005-288825 | 10/2005 |

* cited by examiner

*Primary Examiner*—Stephone B Allen
*Assistant Examiner*—Jennifer L. Doak
(74) *Attorney, Agent, or Firm*—Gerald E. Hespos; Anthony J. Casella (57) ABSTRACT

An optical element holder is provided with a holding frame having a side surface provided spaced apart by a specific distance from an end portion of the correction lens in a longitudinal direction by deeming a light scanning direction as the longitudinal direction and holding the correction lens so as to cover the correction lens except for at least an incident portion and an exiting portion of light, and a pushing member that pushes the correction lens toward the holding frame, so that displacement in the light scanning direction due to heat of the optical element is lessened.

20 Claims, 9 Drawing Sheets

OPTICAL ELEMENT HOLDER, LIGHT SCANNING UNIT, AND IMAGE FORMING APPARATUS WITH ACCOMMODATION FOR HEAT-RELATED DIMENSIONAL CHANGES OF OPTICAL ELEMENT

BACKGROUND OF THE INVENTION

1. Field of the Invention

The present invention relates to an optical element holder and a light scanning unit used in an image forming apparatus, such as a printer, a facsimile machine, and a copying machine.

2. Description of the Related Art

Recently, a digital printer, a copying machine, and the like are provided with a laser scanner unit (hereinafter, abbreviated to LSU) that performs scanning using a laser beam in order to form an image on the surface of an image carrier, such as a photoconductive drum.

The LSU has optical components, such as a laser light source, a polygon mirror, an fθ lens, and a reflection mirror. These optical components are disposed fixedly at specific positions on the frame of the LSU. In this LSU, light emitted from the laser light source is deflected on the surface of the polygon mirror to be scanned equiangularly, and then scanned by the fθ lens at a constant velocity on the image carrier used as an image forming surface. The fθ lens is a lens elongated in the light scanning direction, and it is directly placed on the housing of the LSU (for example, see JP-UM-A-6-43617).

Meanwhile, there has been a need for a color image forming apparatus in recent years to increase a speed, and a tandem-type image forming apparatus is now being adopted, in which image forming units for black, yellow, magenta, and cyan are disposed separately.

For the tandem-type image forming apparatus to achieve a reduction in size, there has been proposed a method of scanning light on the image carrier in each image forming unit using a single polygon mirror (for example, see JP-A-2005-288825).

Figure 10:
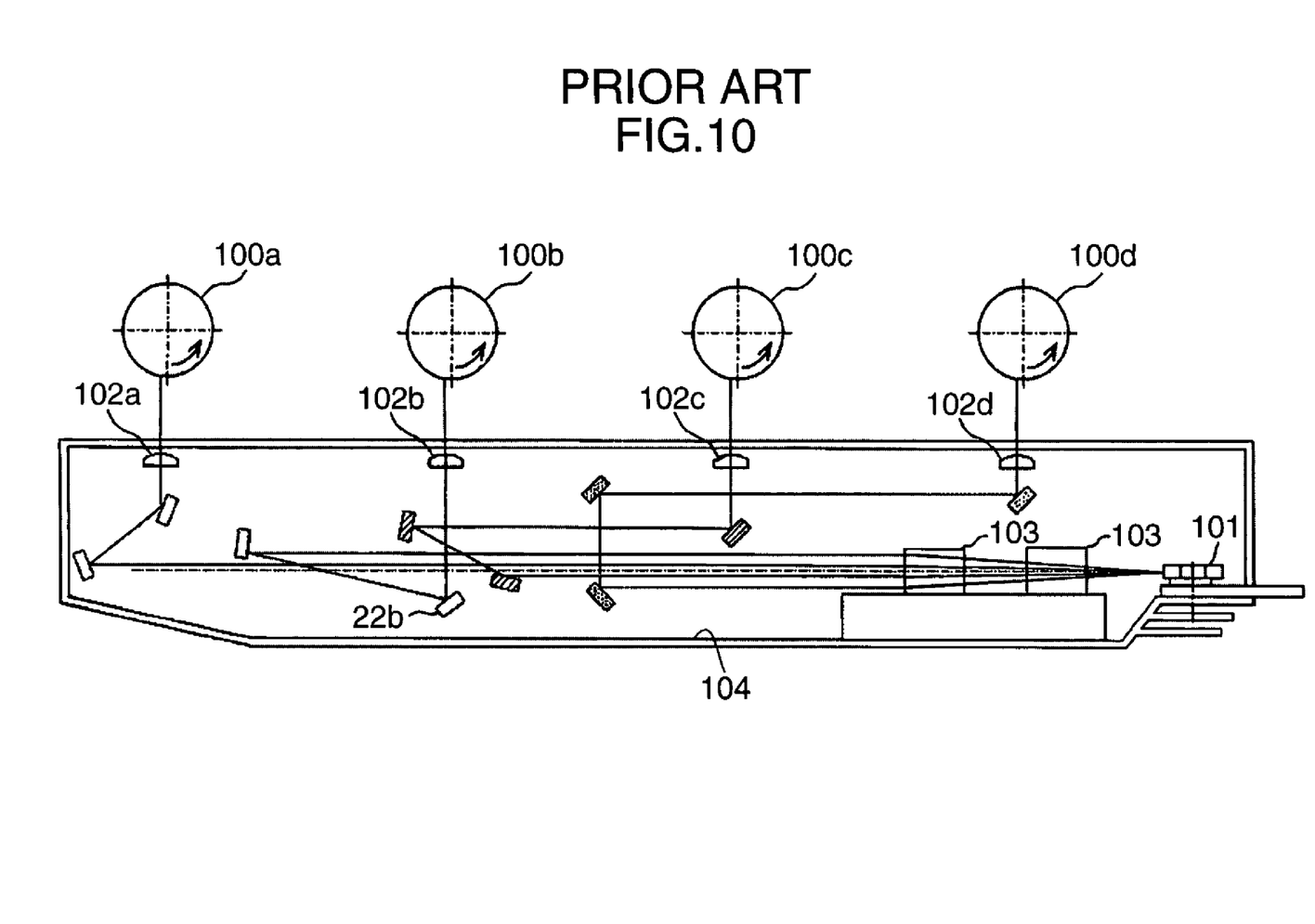
FIG. 10 is a schematic cross section of a laser scanner unit in a tandem-type image forming apparatus in the related art.

FIG. 10 is a schematic cross section of the LSU disposed at the lower position of the tandem-type image forming apparatus in the related art. As is shown in FIG. 10, a photoconductive drum 100a for black, a photoconductive drum 100b for cyan, a photoconductive drum 100c for magenta, and a photoconductive drum 100d for yellow are provided.

Laser beams emitted from four laser light sources (not shown) corresponding to four dyes are scanned equiangularly by a single polygon mirror 101 and scanned on the respective photoconductive drums at a constant velocity by a group of fθ lenses. The group of fθ lenses is formed of scanning lenses 103 and correction lenses 102a, 102b, 102c, and 102d for the respective laser beams.

The scanning lenses 103 corresponds to the fθ lens disclosed in JP-UM-A-6-43617 and chiefly plays a role of scanning a laser beam at a constant velocity. The correction lenses 102a, 102b, 102c, and 102d chiefly play a role of correcting bows in the sub-scanning direction (a phenomenon that the scanning line of a light beam deflected by the deflector is curved).

Such correction lenses 102a, 102b, 102c, and 102d are unnecessary in the image forming apparatus in the related art disclosed in JP-UM-A-6-43617. However, for the image forming apparatus of FIG. 10, it is necessary to form images of laser beams on the respective photoconductive drums 100a through 100d, and because correction by the scanning lenses 103 alone is insufficient, there arises a need to provide the correction lenses 102a through 102d for the respective photoconductive drums.

As is shown in FIG. 10, in order to prevent a correction lens for a given dye from interfering with the optical path of the laser for another dye, the correction lenses 102a, 102b, 102c, and 102d cannot be placed directly on the bottom surface 104 of the LSU.

Hence, the correction lenses 102a, 102b, 102c, and 102d have to be disposed spaced apart from the bottom surface 104 to form a space for allowing a laser beam to pass through. The correction lenses 102a, 102b, 102c, and 102d therefore need to be fixed to the housing of the LSU at the both ends (the both end portions in the horizontal direction deemed as the longitudinal direction of the lenses).

The LSU, however, is provided with heat sources, such as the laser light source and a motor to rotate the polygon mirror 101, and due to heat from these heat sources, the correction lenses 102a, 102b, 102c, and 102d undergo thermal expansion. In the event of thermal expansion when the correction lenses 102a, 102b, 102c, and 102d are fixed at the both ends, bending occurs in the vertical direction with respect to the longitudinal direction (light scanning direction). When bending occurs in the correction lenses 102a, 102b, 102c, and 102d as described above, displacement occurs in the light scanning direction, which results in a color shift in a tandem-type color copying machine or the like.

SUMMARY OF THE INVENTION

An advantage of the invention is to provide an optical element holder capable of lessening displacement of a light beam in the light scanning direction due to heat of the optical element, and a light scanning unit using the same as well as an image forming apparatus equipped with the same.

An optical element holder according to one aspect of the invention includes a holding frame having a side surface provided spaced apart by a specific distance from an end portion of a correction lens in a longitudinal direction by deeming a light scanning direction as the longitudinal direction and holding the correction lens so as to cover the correction lens except for at least an incident portion and an exiting portion of light, and a pushing member that pushes the correction lens toward the holding frame.

A light scanning unit according to another aspect of the invention includes: a light source portion having plural light sources; a rotary polyhedron to deflect beams of light emitted from the plural light sources; plural correction lenses to form images of the beams of light emitted from the plural light sources and deflected by the rotary polyhedron on corresponding image carriers; the optical element holder described above to hold at least one of the plural correction lenses; and a housing to which the optical element holder is fixed, wherein the optical element holder is fixed to the housing at both end portions of the holding frame.

An image forming apparatus according to still another aspect of the invention includes the light scanning unit described above and plural image forming units that form images using beams of light emitted from the light scanning unit.

According to the invention, it is possible to provide an optical element holder capable of lessening displacement in the light scanning direction due to heat of the correction lens as the optical element, and a light scanning unit using the same as well as an image forming apparatus equipped with the same.

DETAILED DESCRIPTION OF THE PREFERRED EMBODIMENT

Hereinafter, an image forming apparatus according to one embodiment of the invention will be described using a copying machine as an example, and a light scanning unit used in the copying machine as well as an optical element holder used in the light scanning unit will be also described.

Figure 1:
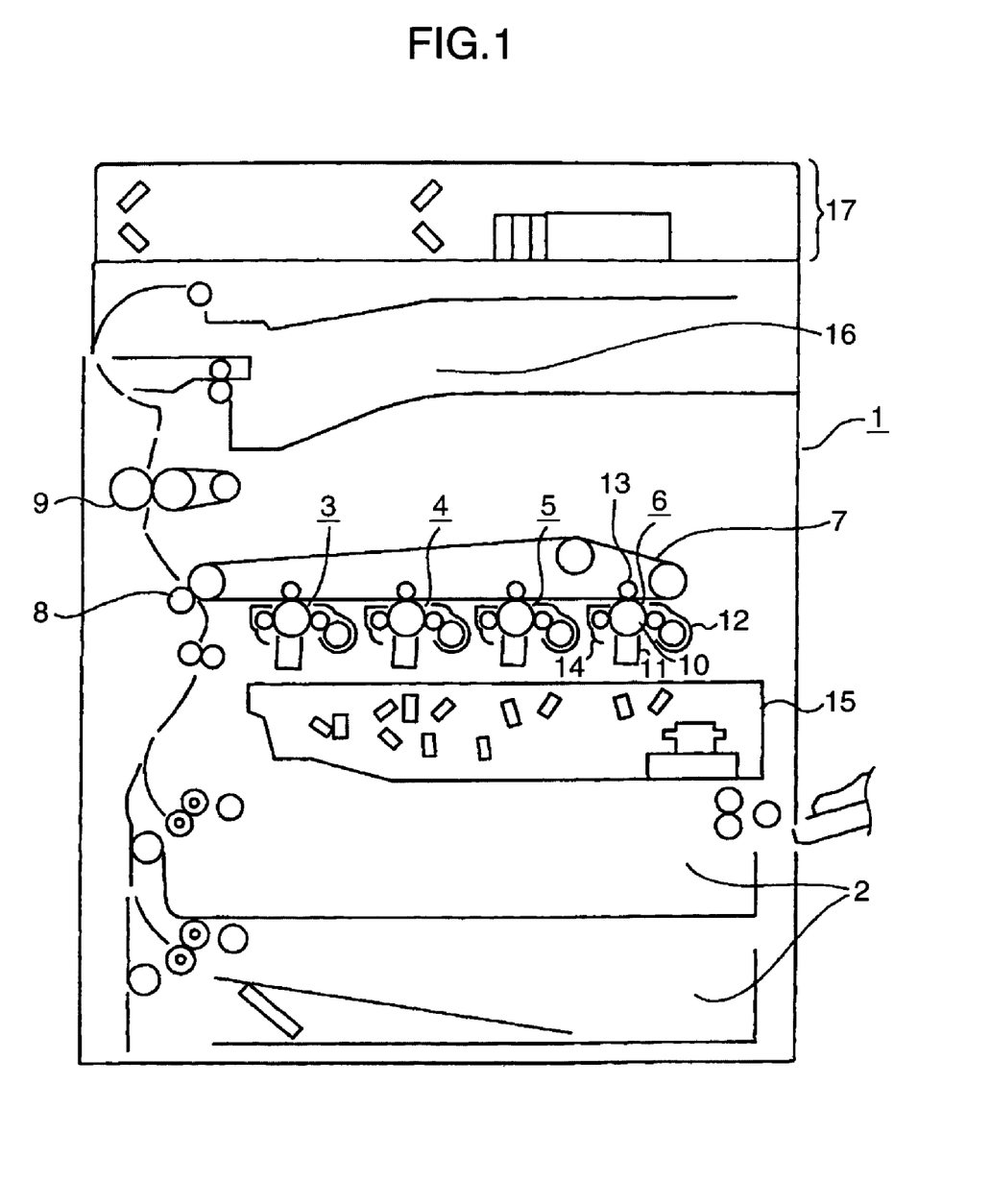
FIG. 1 is a cross section showing the configuration of a copying machine according to one embodiment of the invention.

FIG. 1 is a cross section showing the configuration of the copying machine according to one embodiment of the invention. As is shown in FIG. 1, the copying machine of this embodiment includes, at the bottom portion of the main body 1, two paper feeding cassettes 2 for storing sheets of paper on which images are formed. The copying machine of this embodiment also includes, at the top portion of the main body 1, a document reading unit 17 that reads an image on the document using an exposure lamp, a lens, a mirror, and so forth.

The copying machine of this embodiment is a tandem-type color copying machine, and therefore includes a black image forming unit 3, an yellow image forming unit 4, a cyan image forming unit 5, and a magenta image forming unit 6. An intermediate transfer belt 7 used to superimpose the respective images formed by these image forming units 3, 4, 5, and 6 one on another before being transferred onto a sheet of paper is disposed at or almost at the center portion of the main body 1.

A transfer unit 8 to transfer the toner image formed on the intermediate transfer belt 7 onto a sheet of paper fed from the paper feeding cassette 2 is provided downstream from the black image forming unit 3. Further, a fixing unit 9 to fix the toner image transferred onto the sheet of paper is provided above the transfer unit 8. Below the document reading unit 17, a discharge tray 16 is provided for discharging thereon the sheet of paper on which the toner image is fixed by the fixing unit 9.

The image forming units will now be described. Because the basic configuration is the same for all the four image forming units 3, 4, 5, and 6, a description will be given using the magenta image forming unit 6 as an example.

As is shown in FIG. 1, the magenta image forming unit 6 is formed of a photoconductive drum 10, a charger 11, a developing device 12, a transfer device 13, a cleaning unit 14, and so forth.

A laser scanner unit (hereinafter, abbreviated to LSU) 15 as an example of the light scanning unit of the invention that forms electrostatic images by scanning light on the surfaces of the respective photoconductive drums charged by the corresponding chargers in the four image forming units 3, 4, 5, and 6 is also provided. The LSU 15 is disposed below the four image forming units 3, 4, 5, and 6.

Figure 2:
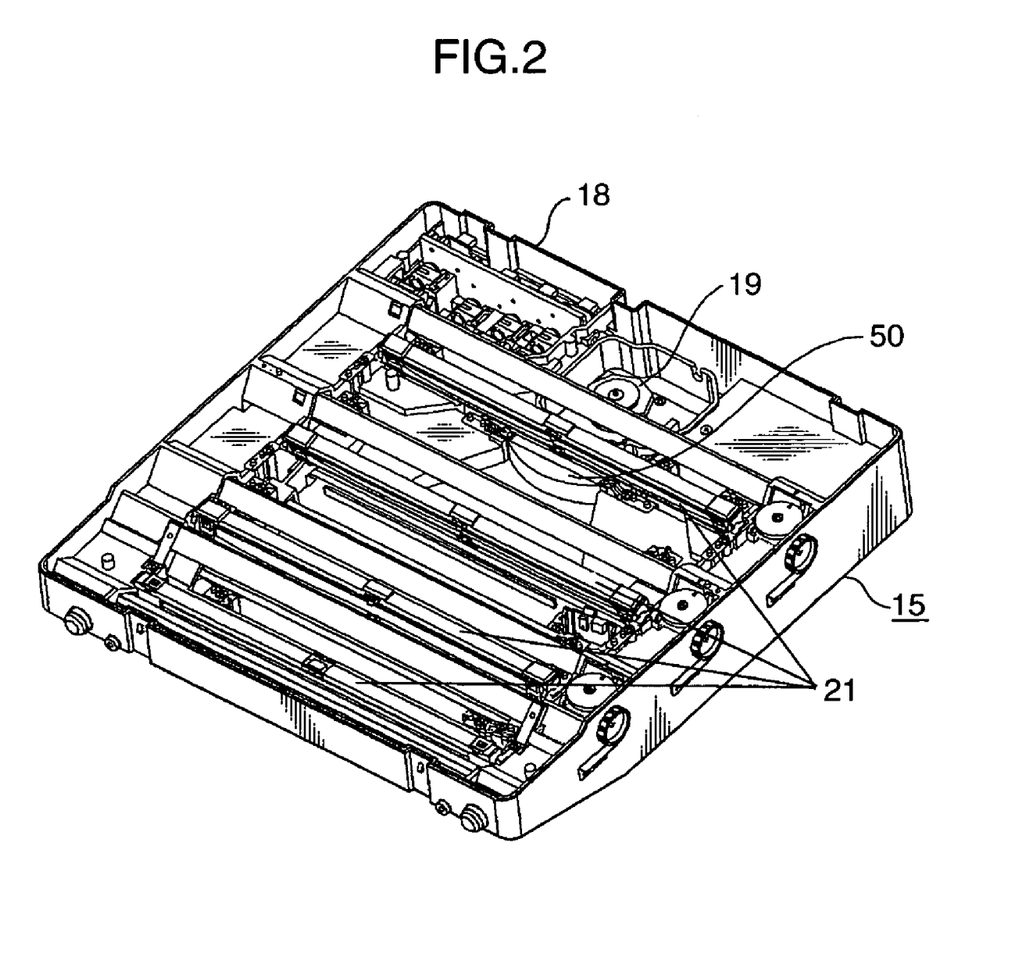
FIG. 2 is a perspective view of a laser scanner unit shown in FIG. 1.
Figure 3:
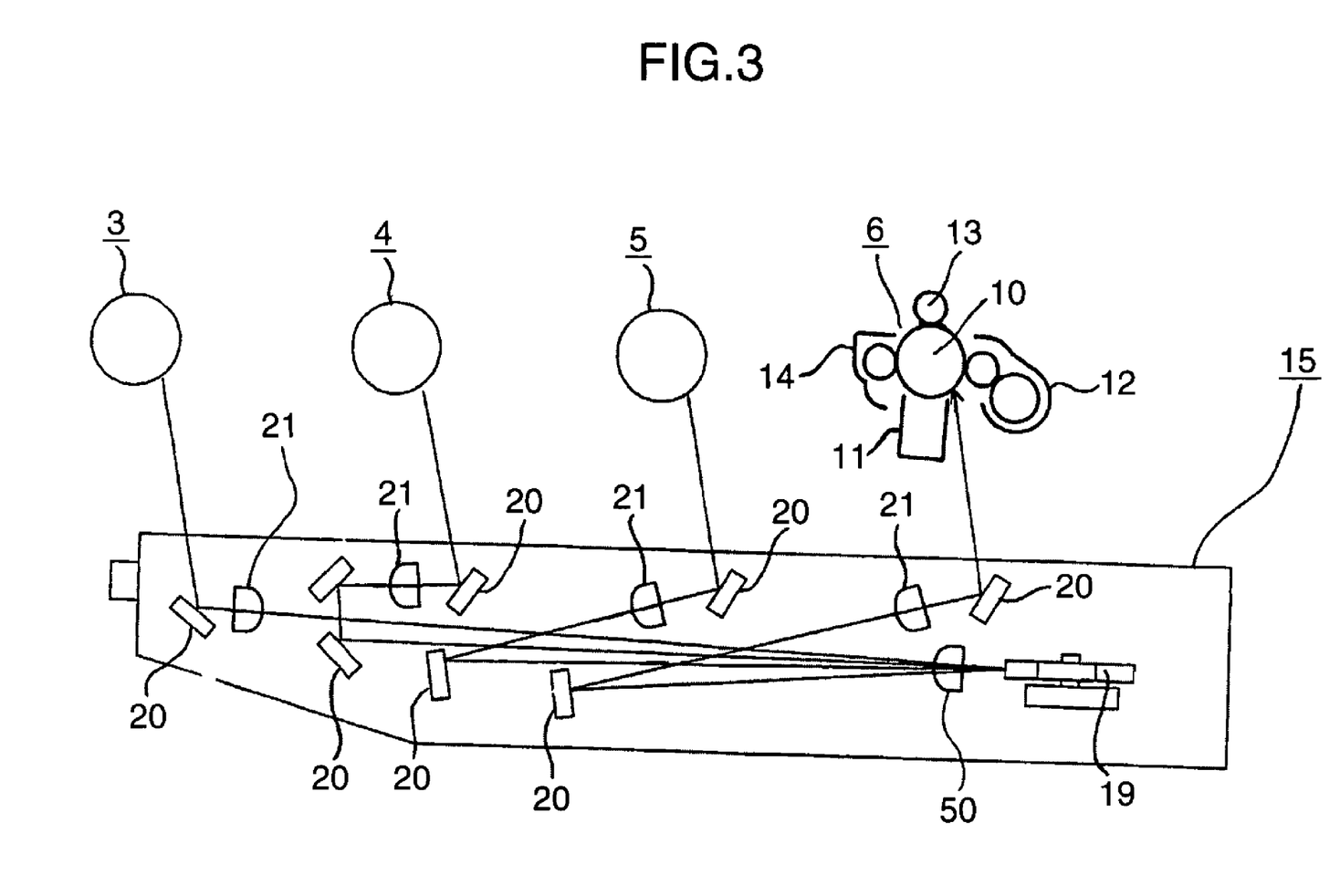
FIG. 3 is a schematic cross section of the laser scanner unit shown in FIG. 1.

FIG. 2 is a perspective view of the LSU 15 and FIG. 3 is a schematic cross section of the LSU 15. FIG. 3 shows the magenta image forming unit 6 alone in detail and shows the other black image forming unit 3, yellow image forming unit 4, and cyan image forming unit 5 schematically.

As is shown in FIG. 2, the LSU 15 includes a laser light source unit 18 having four laser light sources, a polygon mirror 19 that deflects laser beams to be scanned equiangularly for the laser beams to scan the surfaces of the photoconductive drums, and a scanning lens 50 having the capability of scanning the laser beams that have been scanned equiangularly on the photoconductive drums in the respective image forming units 3, 4, 5, and 6 at a constant velocity.

Also, as is shown in FIG. 3, the LSU 15 is provided with plural mirrors 20 to guide laser beams deflected by the polygon mirror 19 to the photoconductive drums in the respective image forming units 3, 4, 5, and 6, and plural correction lens units 21 to form images of the laser beams having passed through the scanning lens 50 on the surfaces of the photoconductive drums.

The group of fθ lenses is formed of the scanning lens 50 and the plural correction lens units 21. Besides the correction capability of scanning the laser beams that have been scanned equiangularly on the surfaces of the photoconductive drums at a constant velocity, the correction lenses provided to the correction lens units 21 have a chief capability of correcting bows in the sub-scanning direction.

Figure 4:
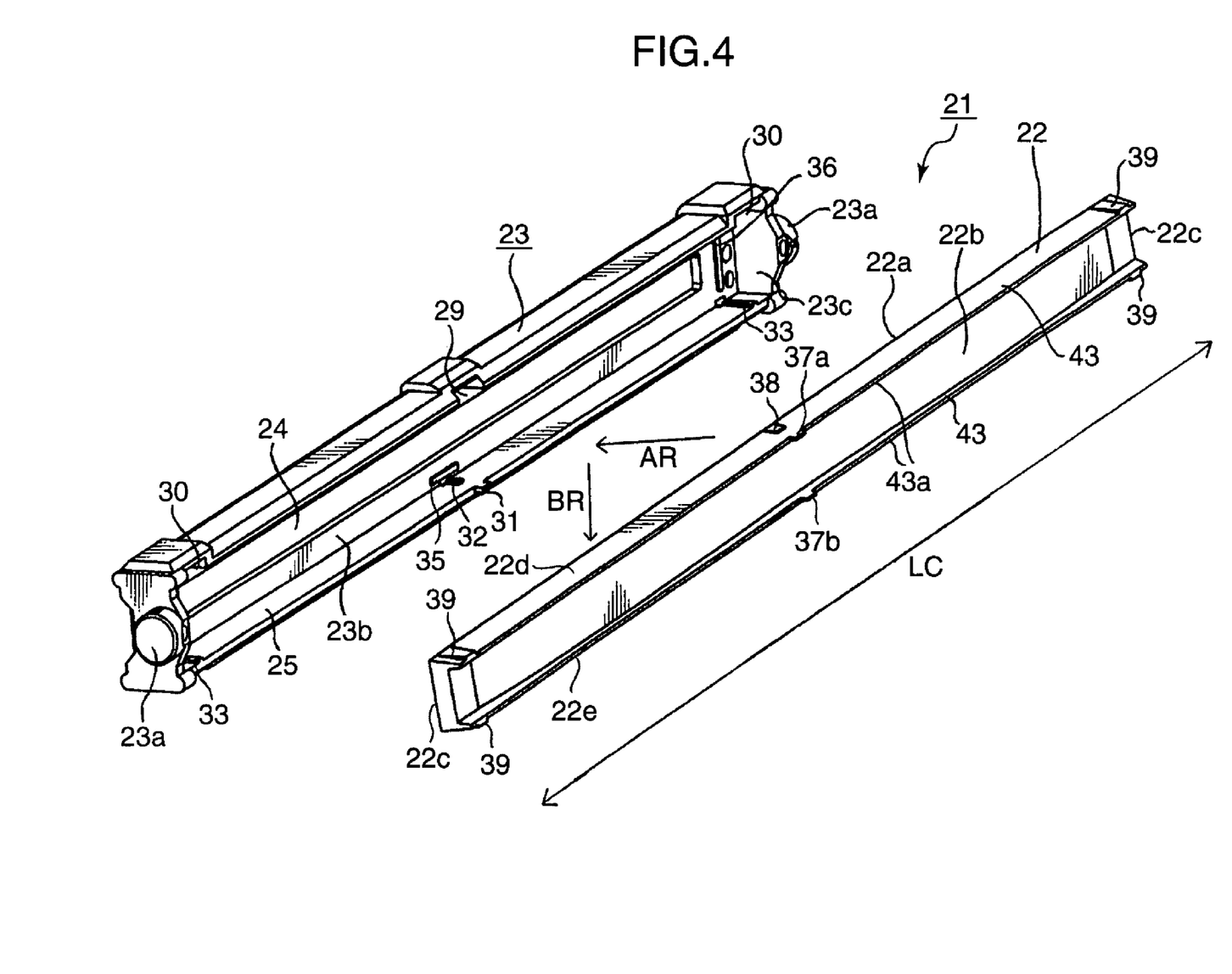
FIG. 4 is an exploded perspective view of a correction lens unit shown in FIG. 2 and FIG. 3.

The configuration of each correction lens unit 21 will now be described. FIG. 4 is an exploded perspective view of the correction lens unit 21. As is shown in FIG. 4, the correction lens unit 21 has a correction lens 22 as an example of an optical element and a holding frame 23 that holds the correction lens 22.

The correction lens 22 has a surface 22b formed of a toroidal surface that becomes thinner from the center to the both ends in the longitudinal direction LC coinciding with the light scanning direction, and a surface 22a formed of a plane surface on the opposite side. The surface 22a is parallel to the longitudinal direction LC. Ribs 43 are provided at the top and the bottom of these surfaces 22a and 22b in the direction from the surface 22a to the surface 22b. The ribs 43 are formed in such a manner that the tip ends 43a are parallel to the longitudinal direction LC.

Center positioning protrusions 37a and 37b extending from the tip ends of the top and bottom ribs 43 in the vertical direction with respect to the surface 22a are provided at the center in the longitudinal direction LC. In addition, convex portions 38 and convex portions 39 are formed, respectively, in the top and bottom surfaces at the center in the longitudinal direction LC and the both ends of the correction lens 22. In FIG. 4, the top surface of the correction lens 22 is shown as a surface 22d and the bottom surface as a surface 22e. The direction of the surface 22e as the bottom surface is indicated by an arrow LC in FIG. 4.

The correction lens 22 as a whole is molded of resin. In this embodiment, the surface 22b is the incident surface on which a laser beam goes incident, and the surface 22a is the exiting surface.

The holding frame 23 will now be described. The holding frame 23 is a frame shaped using an aluminum die cast having a U-shaped cross section to be long in the longitudinal direction LC. The holding frame 23 has side surfaces 23c at the both ends and holds the correction lens 22 so as to cover the same. By inserting the correction lens 22 into the holding frame 23 from the surface 22a as is indicated by an arrow AR of FIG. 4, the correction lens 22 is held by the holding frame 23.

In order to insert the correction lens 22 as described above, the holding frame 23 is provided with an insertion port 25 corresponding to an open portion in the shape of a letter U. In addition, given a surface 23b as the surface of the holding frame 23 that opposes the surface 22a when the correction lens 22 is inserted, then an opening portion 24 is formed in the surface 23b along the longitudinal direction LC. Supporting shafts 23a in the shape of a cylindrical column are provided to the both ends of the holding frame 23.

Further, as is shown in FIG. 4, a concave portion 29 and concave portions 30 are formed along the longitudinal direction LC, respectively, at the center of the upper inner wall and the both ends of the holding frame 23. A center positioning protrusion 31 that protrudes in the opposite direction of the insertion direction AR of the correction lens 22 is formed in the holding frame 23 on the lower hem of the insertion port 25 at the center in the longitudinal direction LC.

A convex portion 32 and convex portions 33 are formed, respectively, at the center in the longitudinal direction LC and the both ends of the holding frame 23 on the inner side of the lower surface. At the center of the longitudinal direction LC, convex portions 35 are provided to the top and bottom rims of the opening portion 24 in the surface 23b and convex portions 36 are formed on the right and left rims of the opening portion 24 in the surface 23b.

Although it will be described below, when the correction lens 22 is inserted into the holding frame 23, the correction lens 22 is positioned in a downward direction (see an arrow BR) with respect to the holding frame 23 as the correction lens 22 abuts on the convex portion 32 and the convex portions 33. Also, as the correction lens 22 abuts on the convex portions 35 and the convex portions 36, the correction lens 22 is positioned in the insertion direction (the direction indicted by the arrow AR) with respect to the holding frame 23. Herein, the positioning surface defined by the convex portion 32 and the convex portions 33 is given as a first reference surface 44 (see FIG. 6C and FIG. 6D) and the positioning surface defined by the convex portions 35 and the convex portions 36 is given as a second reference surface 45 (see FIG. 6C and FIG. 6D).

Figure 5:
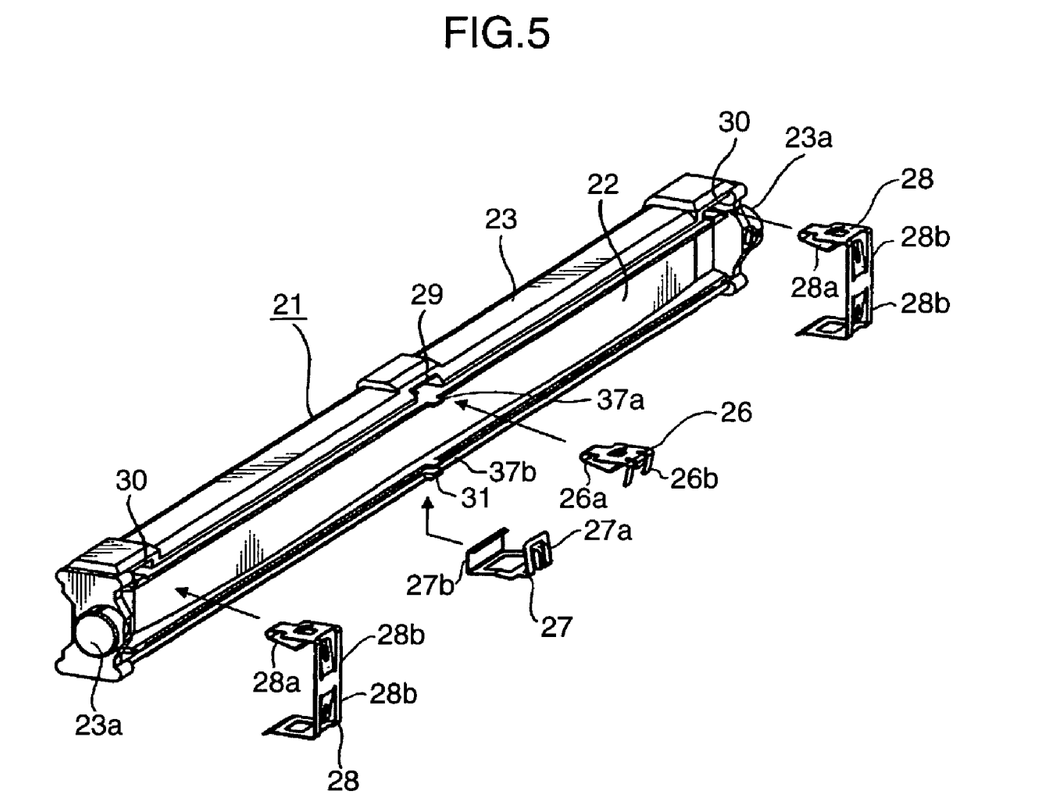
FIG. 5 is a perspective view used to describe a method of fixing the correction lens shown in FIG. 4 after it is inserted into a holding frame.

FIG. 5 is a perspective view used to describe a method of fixing the correction lens 22 after it is inserted into the holding frame 23. As is shown in FIG. 5, after the correction lens 22 is inserted into the holding frame 23, the position of the correction lens 22 inside the holding frame 23 is fixed using plural spring members. As the plural spring members, a total of four spring members of three kinds including an upper spring member 26, a lower spring member 27, and two end spring members 28 are used. Hereinafter, the plural spring members specified above will be described.

As is shown in FIG. 5, the upper spring member 26 has a blade spring portion 26a that can be inserted into the concave portion 29 and a fitting portion 26b for the center positioning protrusion 37a to be fit therein. The lower spring member 27 has a fitting hole 27a for the center positioning protrusions 31 and 37b to fit therein and a U-shaped portion 27b. Each end spring member 28 has a blade spring portion 28a that can be inserted into the concave portion 30 and pushes the correction lens 22 downward and blade spring portions 28b that push the correction lens 22 in the insertion direction of the correction lens 22 (see the arrow AR of FIG. 4).

Figure 6A:
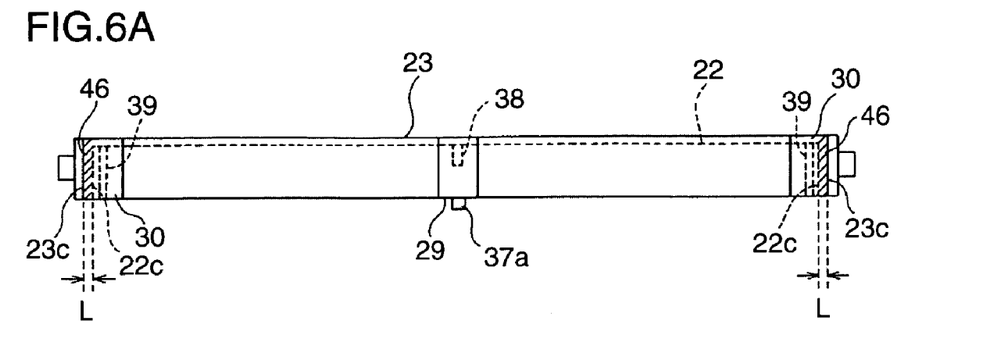
FIG. 6A is a top view of the correction lens unit shown in FIG. 2 and FIG. 3.
Figure 6B:
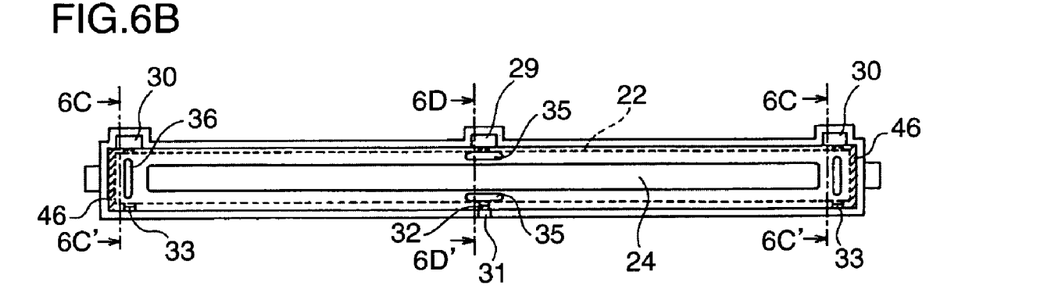
FIG. 6B is a front view of the correction lens unit shown in FIG. 2 and FIG. 3.
Figure 6C:
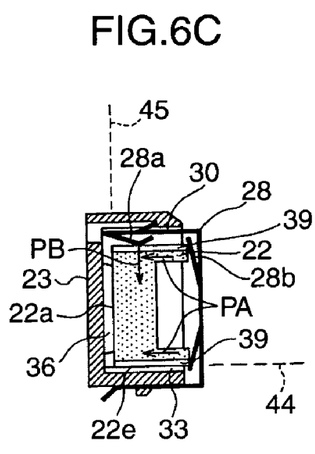
FIG. 6C is a cross section taken on line 6C-6C' of FIG. 6B.
Figure 6D:
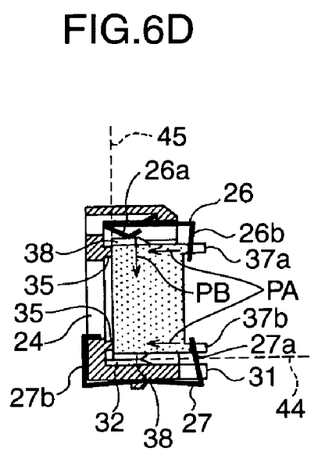
FIG. 6D is a cross section taken on line 6D-6D' of FIG. 6B.

Assembly of the correction lens unit 21 will now be described and the configuration of the correction lens unit 21 will be also described more in detail. FIG. 6A is a top view showing a state where the correction lens 22 is inserted into the holding frame 23. FIG. 6B is a front view showing a state where the correction lens 22 is inserted into the holding frame 23. FIG. 6C is a cross section taken on line 6C-6C' of FIG. 6B. FIG. 6D is a cross section taken on line 6D-6D' of FIG. 6B. For ease of description, plural spring members are omitted in FIG. 6A and FIG. 6B.

As are shown in FIGS. 6A and 6B, the convex portion 38 of the correction lens 22 is disposed in the concave portion 29 of the holding frame 23, and the convex portions 39 of the correction lens 22 are disposed in the concave portions 30 of the holding frame 23. Further, the correction lens 22 is inserted into the holding frame 23 in such a manner that the position of the center position protrusion 37b of the correction lens 22 coincides with the position of the center positioning protrusion 31 of the holding frame 23.

Subsequently, as are shown in FIG. 5 and FIG. 6D, the blade spring portion 26a of the upper spring member 26 is inserted into a space formed between the concave portion 29 of the holding frame 23 and the top surface of the correction lens 22 described above. As the blade plate portion 26a is inserted in this manner, the convex portion 38 of the correction lens 22 is pressed against the blade spring portion 26a, while the correction lens 22 is pushed downward (in the direction indicated by an arrow PB) to be fixed as is shown in FIG. 6D. Also, as the center positioning protrusion 37a fits in the fitting portion 26b of the upper spring member 26, the position of the correction lens 22 in the longitudinal direction LC is fixed.

Further, the lower spring member 27 is attached by fitting the center positioning protrusions 31 and 37b into the fitting hole 27a and hooking up the end of the U-shaped portion 27b to the rim of the opening portion 24. By attaching the lower spring member 27 in this manner, one end of the lower spring member 27 is supported on the rim of the opening portion 24 and the other end is supported on the center positioning protrusions 31 and 37b as is shown in FIG. 6D. The lower spring member 27 thus becomes able to fix the position of the correction lens 22 inside the holding frame 23 in the longitudinal direction LC. The correction lens 22 is also pushed downward (the direction indicated by the arrow PB of FIG. 6D) by the lower spring member 27.

Subsequently, as are shown in FIG. 5 and FIG. 6C, the blade spring portions 28a of the end spring members 28 are inserted into spaces formed at two places between the concave portions 30 of the holding frame 23 and the top surface of the correction lens 22 described above. As the blade spring portions 28a are inserted in this manner, the convex portions 39 of the correction lens 22 are pressed against the blade spring portions 28a, and the correction lens 22 is pushed downward (the direction indicated by the arrow PB) and fixed as is shown in FIG. 6C.

The correction lens 22 is also pushed in the insertion direction (the direction indicated by the arrow PA) with respect to the holding frame 23 by the blade spring portions 28b. The bottom surface 22e of the correction lens 22 is therefore pressed by the first reference surface 44 and the surface 22a is pressed by the second reference surface 45. The correction lens 22 is consequently held by the holding frame 23 having rigidity while abutting on the reference surface thereof.

The length of correction lens 22 in the longitudinal direction LC is shorter than the inner length of the holding frame 23 in the longitudinal direction LC. Hence, as is shown in FIG. 6A, the side surfaces 23c at the both ends of the holding frame 23 are disposed spaced apart by a distance L from the both ends 22c of the correction lens 22.

Figure 6E:
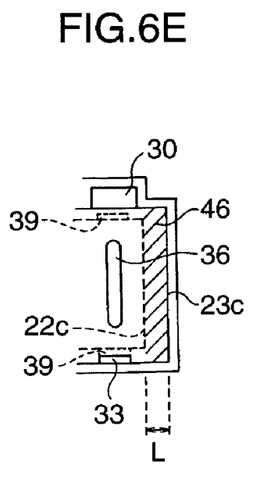
FIG. 6E is an enlarged view of the right end of the correction lens and the holding frame shown in FIG. 6B.

FIG. 6E is an enlarged view of the right end of the correction lens 22 and the holding frame 23 of FIG. 6B. In this embodiment, as is shown in FIG. 6E, spaces 46 having the distance L are provided at the both ends of the correction lens 22 in the correction lens unit 21. In other words, spaces having a total distance of 2 L are provided between the correction lens 22 and the holding frame 23. The correction lens 22 and the holding frame 23 are configured in such a manner that the distance L is, for example, equal to or longer than ½ of the maximum extensible distance of the correction lens 22 due to thermal expansion within a usable temperature range. An example of the specific distance of the invention corresponds to the distance 2 L.

Figure 7:
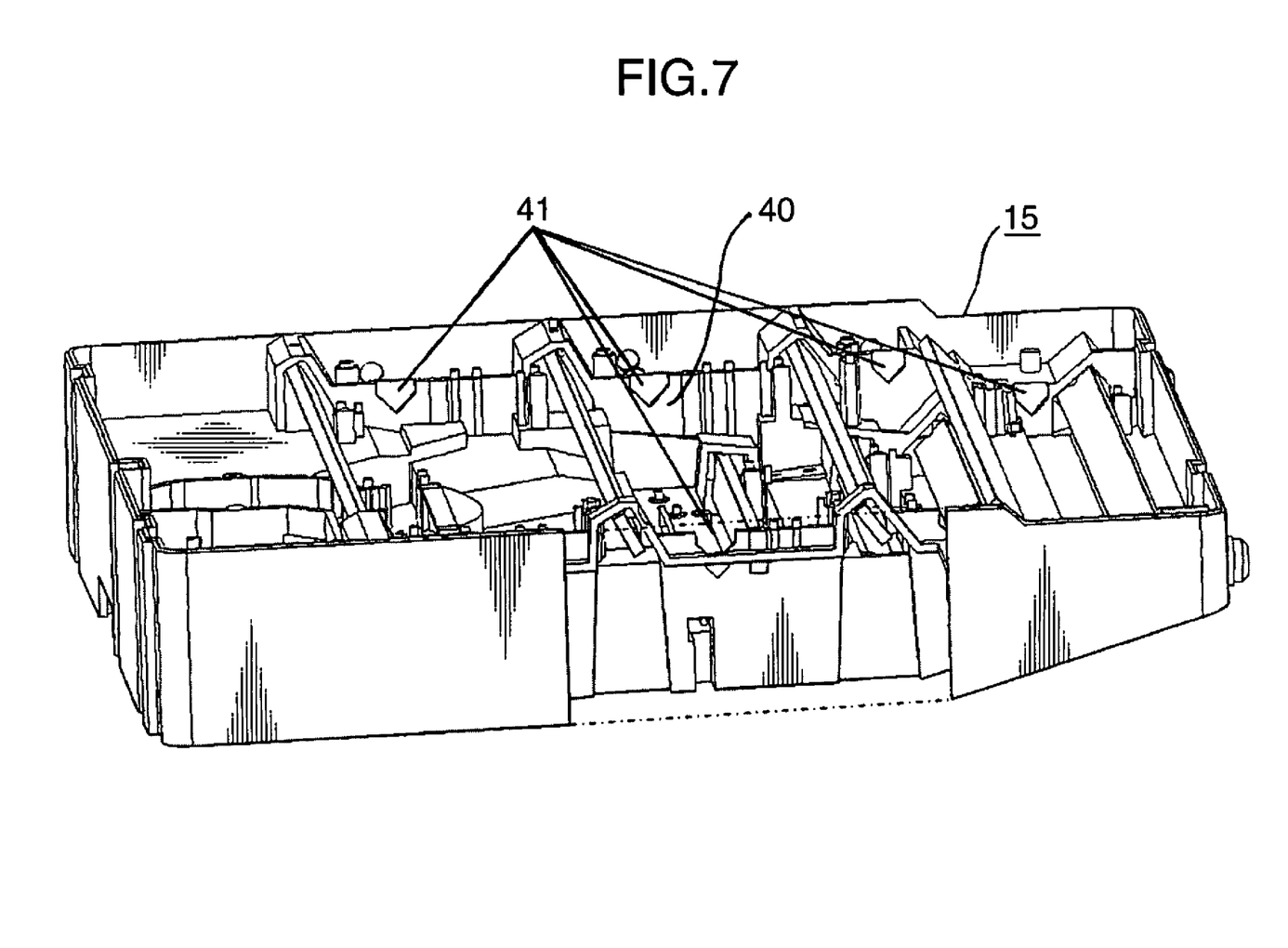
FIG. 7 is a perspective view showing a state where the correction lens units are removed from the laser scanner unit shown in FIG. 2 and FIG. 3.
Figure 8:
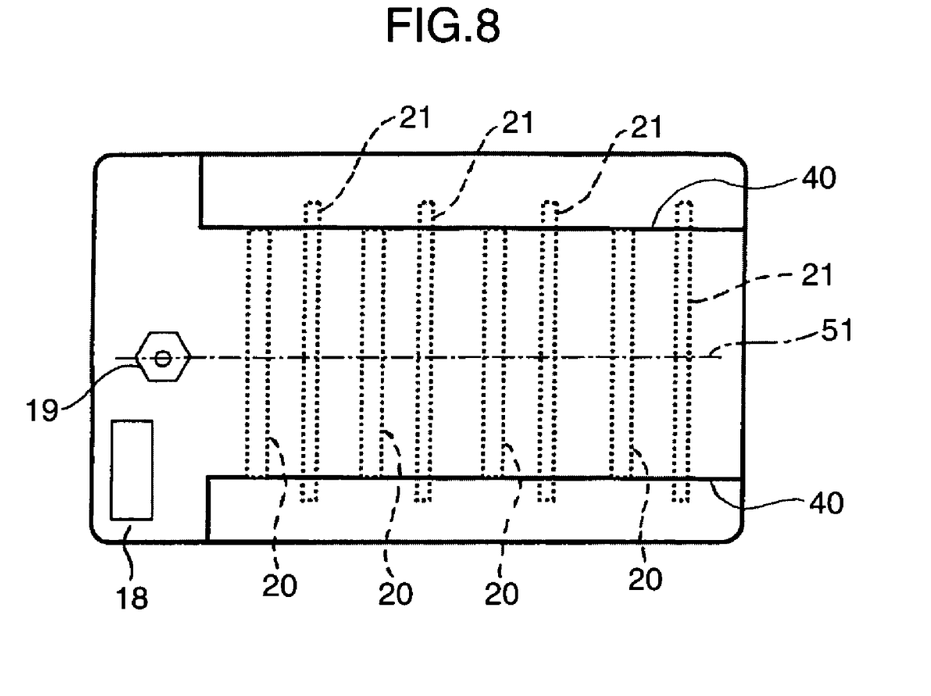
FIG. 8 is a plan view showing the configuration of the laser scanner unit shown in FIG. 2 and FIG. 3.

The attachment of the correction lens unit 21 to the LSU 15 will now be described. FIG. 7 is a view showing the outward appearance when plural correction lens units 21 are removed from the LSU 15. FIG. 8 is a plan view showing the configuration of the LSU 15. As is shown in FIG. 7, plural pairs of V-shaped grooves 41 are formed in two side plates 40 provided inside the LSU 15 for the respective correction lens units 21. The supporting shafts 23a of the holding frame 23 are mounted on a pair of V-shaped grooves 41. In this manner, as is shown in FIG. 8, four correction lens units 21 are disposed inside the LSU 15, so that respective laser beams from the laser light source unit 18 are deflected by the polygon mirror 19 and reflected on the four mirrors 20 after passing through the corresponding lens units 21 to be guided to the photoconductive drums in the corresponding image forming units 3, 4, 5, and 6.

Figure 9A:
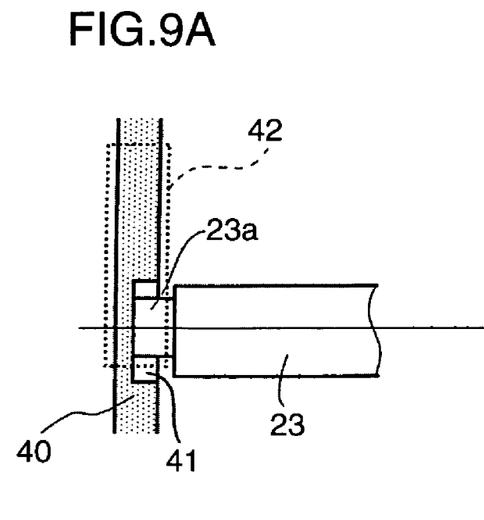
FIG. 9A is an enlarged plan view of an end portion of the correction lens unit in the laser scanner unit shown in FIG. 2 and FIG. 3.
Figure 9B:
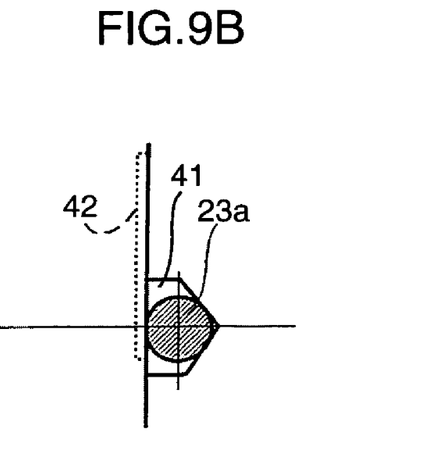
FIG. 9B is an enlarged side view of an end portion of the correction lens unit in the laser scanner unit shown in FIG. 2 and FIG. 3.

FIG. 9A is a plan view showing the configuration of the end portion of the correction lens unit 21 attached to the LSU 15. FIG. 9B is a side view of FIG. 9A. As are shown in FIG. 9A and FIG. 9B, a blade spring 42 as an example of an elastic member of the invention that pushes the supporting shaft 23a in the direction of the bottom of the grooves 41 is provided at the top hem of the side plate 40 provided with the groove 41. The correction lens unit 21 is positioned while being adjustable in a rotatable manner by the blade plate 42.

As has been described, in this embodiment, the correction lens 22 is held by the holding frame 23 having rigidity, and pushed by the spring members (the upper spring member 26, the lower spring member 27, and the two end spring members 28) to be fixed on the first reference surface 44 (the PB direction) and the second reference surface 45 (the PA direction) at the both end portions and the center portion of the correction lens 22, respectively, whereas it is not pushed and fixed in the longitudinal direction LC and the inner side surfaces 23c of the holding frame 23 are provided spaced apart by the distance L from the both ends 22c of the correction lens 22.

Hence, even when the correction lens 22 undergoes expansion due to heat, bending of the correction lens 22 is corrected by the pushing force toward the first reference surface 44 and the second reference surface 45, while the extension in the longitudinal direction LC is allowed by the specific distance L provided on the outside of each of the both ends 22c. It is thus possible to lessen bending of the correction lens 22.

Also, in this embodiment, because the correction lens unit 21 is positioned in the grooves 41 formed in the side plates 40 of the LSU 15 in a rotatable manner, it becomes easier to perform a work of adjusting the angle of the correction lens 22 using a jig for correcting the bows. Further, by bonding and fixing the supporting shafts 23a to the side plates 40 after the angle is adjusted, it is possible to prevent misalignment.

In addition, because the frame (housing) of the LSU 15 is made of resin and the holding frame 23 has the higher rigidity, it is not the holding frame 23a but the frame of the LSU 15 that bends due to thermal expansion. However, as is shown in FIG. 8, the frame of the LSU 15 is formed bilaterally symmetrical with respect to the optical axis 51 as the center axis linking the center of the polygon mirror 19 and the center of the correction lens 22 in the longitudinal direction LC. Bending of the frame of the LSU 15 therefore gives little influence to the angle and the position of the correction lens 22 and to the position accuracy of the other optical components.

The optical element holder of the invention corresponds, for example, to the holding frame 23, the upper spring member 26, the lower spring member 27, and the end spring members 28 of this embodiment. The pushing member of the invention corresponds, for example, to the upper spring member 26, the lower spring member 27, and the end spring members 28. The invention, however, is not limited to the configuration specified above. Also, an example of the housing of the invention corresponds to the side plates 40.

In this embodiment, the correction lens 22 is pushed toward the holding frame 23 in the direction PA shown in FIG. 6C and FIG. 6D (the optical axis direction of the correction lens 22) and the direction PB (the direction orthogonal to the optical axis direction and the light scanning direction of the correction lens 22). The pushing direction of the correction lens 22 toward the holding frame 23 may be the direction PA alone. However, from the viewpoint of fixing the position of the correction lens 22 with respect to the holding frame 23, it is preferable to press the correction lens 22 against the holding frame 23 in two directions.

The correction lens unit 21 of this embodiment is provided with the spaces 46 having the distance L at the both end portions in the longitudinal direction LC. However, the spaces 46 at the both ends may not necessarily have the same distance. Alternatively, one end of the correction lens 22 may abut on the holding frame 23 so that the space is provided on one side alone. In this case, however, the distance from the other end of the correction lens 22 to the corresponding inner surface of the holding frame 23 is preferably equal to or longer than the extensible distance of the correction lens 22 due to thermal expansion.

The optical element holder of the invention has an advantage that displacement in the light scanning direction due to heat of the optical element can be lessened, and is therefore useful for a light scanning unit or the like used in an image forming apparatus or the like.

As has been described, an optical element holder according to one aspect of the invention includes a holding frame having a side surface provided spaced apart by a specific distance from an end portion of a correction lens in a longitudinal direction by deeming the light scanning direction as the longitudinal direction and holding the correction lens so as to cover the correction lens except for at least an incident portion and an exiting portion of light, and a pushing member that pushes the correction lens toward the holding frame.

According to the configuration described above, because the holding frame has the side surface provided spaced apart by a specific distance from the end portion of the correction lens in the longitudinal direction by deeming a light scanning direction as the longitudinal direction, it is possible to form a space between the holding frame and the correction lens in the light scanning direction. Also, because the correction lens is held while being pushed toward the holding frame, even when the correction lens undergoes thermal expansion, it is possible to correct bending of the correction lens with a pushing force. Consequently, because bending of the correction lens can be corrected with a pushing force while the correction lens is allowed to extend in the longitudinal direction by the space between the holding frame and the correction lens, it is possible to lessen displacement in the light scanning direction due to heat of the correction lens.

It is preferable that the specific distance is equal to or longer than an extensible distance of the correction lens in the longitudinal direction due to thermal expansion.

In this case, because a space equal to or longer than the extensible distance of the correction lens in the longitudinal direction due to thermal expansion can be formed between the holding frame and the correction lens, even when the correction lens extends in the longitudinal direction due to thermal expansion, a free-extension of the correction lens in the longitudinal direction is allowed, which makes it possible to lessen bending of the correction lens.

It is preferable that the pushing member is provided substantially at a center of the correction lens in the longitudinal direction.

In this case, because the pushing member pushes the correction lens toward the holding frame substantially at the center position of the correction lens in the longitudinal direction, even when the correction lens extends in the longitudinal direction due to thermal expansion, the correction lens extends in a bilaterally symmetrical manner. It is thus possible to lessen imbalanced bending of the correction lens.

It is preferable that the holding frame has two side surfaces provided spaced apart by a specific distance from both end portions of the correction lens in the longitudinal direction.

In this case, because spaces can be formed at the both ends of the correction lens, even when the correction lens extends in the longitudinal direction due to thermal expansion, the both end portions of the correction lens are allowed to extend in a free state without abutting on the holding frame. It is thus possible to further lessen imbalanced bending of the correction lens.

It is preferable that the pushing member pushes the correction lens toward the holding frame along an optical axis direction of the correction lens.

In this case, because the correction lens is pushed toward the holding frame along the optical axis direction of the correction lens, not only is it possible to fix the correction lens to the holding frame in a reliable manner, but it is also possible to lessen bending of the correction lens.

It is preferable that the pushing member further pushes the correction lens toward the holding frame along a direction orthogonal to the optical axis direction and the light scanning direction of the correction lens.

In this case, besides the pushing in the optical axis direction of the correction lens, the correction lens can be also pushed toward the holding frame in the direction orthogonal to the optical axis direction and the light scanning direction of the correction lens. Hence, not only is it possible to fix the correction lens to the holding frame in a more reliable manner, but it is also possible to further lessen bending of the correction lens.

It is preferable that the holding frame is shaped using an aluminum die cast.

In this case, because the rigidity of the holding frame can be increased, not only is it possible to fix the correction lens to the holding frame in a more reliable manner, but it is also possible to further lessen bending of the correction lens.

A light scanning unit according to another aspect of the invention includes: a light source portion having plural light sources; a rotary polyhedron to deflect beams of light emitted from the plural light sources; plural correction lenses to form images of the beams of light emitted from the plural light sources and deflected by the rotary polyhedron on corresponding image carriers; the optical element holder described above to hold at least one of the plural correction lenses; and a housing to which the optical element holder is fixed, wherein the optical element holder is fixed to the housing at both end portions of the holding frame.

According to the configuration described above, because the optical element holder is fixed to the housing at the both end portions of the holding frame, it is possible to fix the correction lens to the light scanning unit in a reliable manner while lessening displacement in the light scanning direction due to heat of the correction lens.

It is preferable that: the optical element holder further includes supporting shafts provided to the both end portions of the holding frame; V-shaped groove portions to hold the supporting shafts are provided to the housing; and the light scanning unit further includes an elastic member that presses the supporting shafts to the groove portions in a state where the supporting shafts are adjustable in a rotatable manner with respect to the groove portions.

In this case, because the supporting shafts of the optical element holder are pressed to the groove portions in the housing while being adjustable in a rotatable manner, it becomes easier to perform a work of adjusting the angle of the correction lens using a jig for correcting the bows or the like. Further, by bonding and fixing the supporting shafts to the groove portions after the angle is adjusted, it is possible to prevent misalignment of the correction lens from the adjusted angle.

It is preferable that rigidity of the holding frame is higher than rigidity of the housing.

In this case, because the rigidity of the holding frame is higher than the rigidity of the housing, even when the holding frame undergoes thermal expansion, it is not the holding frame but the housing that bends, which can lessen the influence to the angle and the position of the correction lens.

An image forming apparatus according to still another aspect of the invention includes the light scanning unit described above, and plural image forming units that form images using beams of light emitted from the light scanning unit.

According to the configuration as above, it is possible to fix the correction lens to the light scanning unit in a reliable manner while lessening displacement in the light scanning direction due to heat of the correction lens, which makes it possible to form a satisfactory image by lessening a color shift.

This application is based on patent application No. 2006-040699 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An optical element holder, comprising:
a holding frame having end surfaces provided spaced apart by a specific distance from end portions of a correction lens in a longitudinal direction by deeming a light scanning direction as the longitudinal direction and having at least first and second side surfaces disposed to cover the correction lens except for at least an incident portion and an exiting portion of light; and
at least one pushing member disposed so that the correction lens is between a part of the pushing member and the first side surface of the holding frame and being configured so that the pushing member pushes the correction lens toward the first side surface of the holding frame.

2. The optical element holder according to claim 1 wherein:
the specific distance is equal to or longer than an extensible distance of the correction lens in the longitudinal direction due to thermal expansion.

3. The optical element holder according to claim 1 wherein:
the pushing member is provided substantially at a center of the correction lens in the longitudinal direction.

4. The optical element holder according to claim 3, wherein:
the holding frame has two end surfaces provided spaced apart by a specific distance from both end portions of the correction lens in the longitudinal direction.

5. The optical element holder according to claim 4, wherein:
the pushing member pushes the correction lens toward the holding frame along an optical axis direction of the correction lens.

6. The optical element holder according to claim 5, wherein:
the pushing member further pushes the correction lens toward the holding frame along a direction orthogonal to the optical axis direction and the light scanning direction of the correction lens.

7. The optical element holder according to claim 1, wherein:
the holding frame is shaped using an aluminum die cast.

8. A light scanning unit, comprising:
a light source portion having plural light sources;
a rotary polyhedron to deflect beams of light emitted from the plural light Sources;
plural correction lenses to form images of the beams of light emitted from the plural light sources and deflected by the rotary polyhedron on corresponding image carriers;
the optical element holder set forth in claim 1 to hold at least one of the plural correction lenses; and
a housing to which the optical element holder is fixed, wherein the optical element holder is fixed to the housing at both end portions of the holding frame.

9. The light scanning unit according to claim 8, wherein:
the optical element holder further comprises supporting shafts provided to the both end portions of the holding frame;
V-shaped groove portions to hold the supporting shafts are provided to the housing; and
the light scanning unit further comprises an elastic member that presses the supporting shafts to the groove portions in a state where the supporting shafts are adjustable in a rotatable manner with respect to the groove portions.

10. The light scanning unit according to claim 8, wherein:
rigidity of the holding frame is higher than rigidity of the housing.

11. An image forming apparatus, comprising:
the light scanning unit set forth in claim 8; and
plural image forming units that form images using beams of light emitted from the light scanning unit.

12. The optical element holder according to claim 1, wherein the pushing member comprises a blade spring portion disposed at least partly between the second side surface of the holding frame and the optical element and being configured for exerting a biasing force for pushing the correction lens toward the first side surface of the holding frame.

13. An optical element holder according to claim 12, wherein the holding frame further comprises a rear surface extending inwardly from the end surfaces and from the first and second side surfaces, the rear surface including an opening for the light, the blade spring portion comprising a first blade spring portion, the pushing member further comprising a second blade spring portion engaging a surface of the correction lens opposite the rear surface and being configured for pushing the correction lens toward the rear surface of the holding frame.

14. The optical element holder according to claim 1, the at least one pushing member comprises a plurality of pushing members.

15. An optical element holder, comprising:
a holding frame having end surfaces spaced apart by a specific distance from end portions of a correction lens in a longitudinal direction by deeming a light scanning direction as the longitudinal direction and having at least first and second side surfaces disposed to cover the correction lens except for at least an incident portion and an exiting portion of light; and
pushing means for pushing the correction lens toward at least one of the first and second side surfaces of the holding frame.

16. The optical element holder of claim 15, wherein the holding frame further includes a rear surface extending inwardly from the end surfaces and from the first and second side surfaces, the rear surface having an opening for the light, the pushing means for pushing the correction lens toward at least one of the first and second surfaces of the holding frame being a first pushing means, the optical element holder further comprising a second pushing means for pushing the correction lens toward the rear surface.

17. The optical element folder of claim 16, wherein the first and second pushing means comprise first and second blade spring portions.

18. A correction lens unit, comprising:
an elongate correction lens having opposite end portions spaced apart along a longitudinal direction;
a holding frame having end surfaces spaced apart by specified distances from the end portions of the correction lens in the longitudinal direction, the holding frame having at least first and second side surfaces disposed to cover the correction lens except for at least an incident portion and an exiting portion of light;
at least one spring member disposed so that the correction lens is between a part of the spring member and at least one of the first and second side surfaces of the holding frame, the spring member being configured for pushing the correction lens toward at least one of the first and second side surfaces of the holding frame.

19. The correction lens unit of claim 18, wherein the holding frame further includes a rear surface extending inwardly from the end surfaces and the first and second side surfaces, the rear surface being formed with an aperture for accommodating the light, the at least one spring member including at least one blade spring portion disposed and configured for pushing the correction lens toward the rear surface of the holding frame.

20. The correction lens unit of claim 19, wherein the at least one spring member comprises at least first and second spring members disposed in proximity to the opposite end portions of the correction lens.

* * * * *